March 20, 1951      G. H. C. CORNER      2,546,088
SLIDING CLASP FASTENER

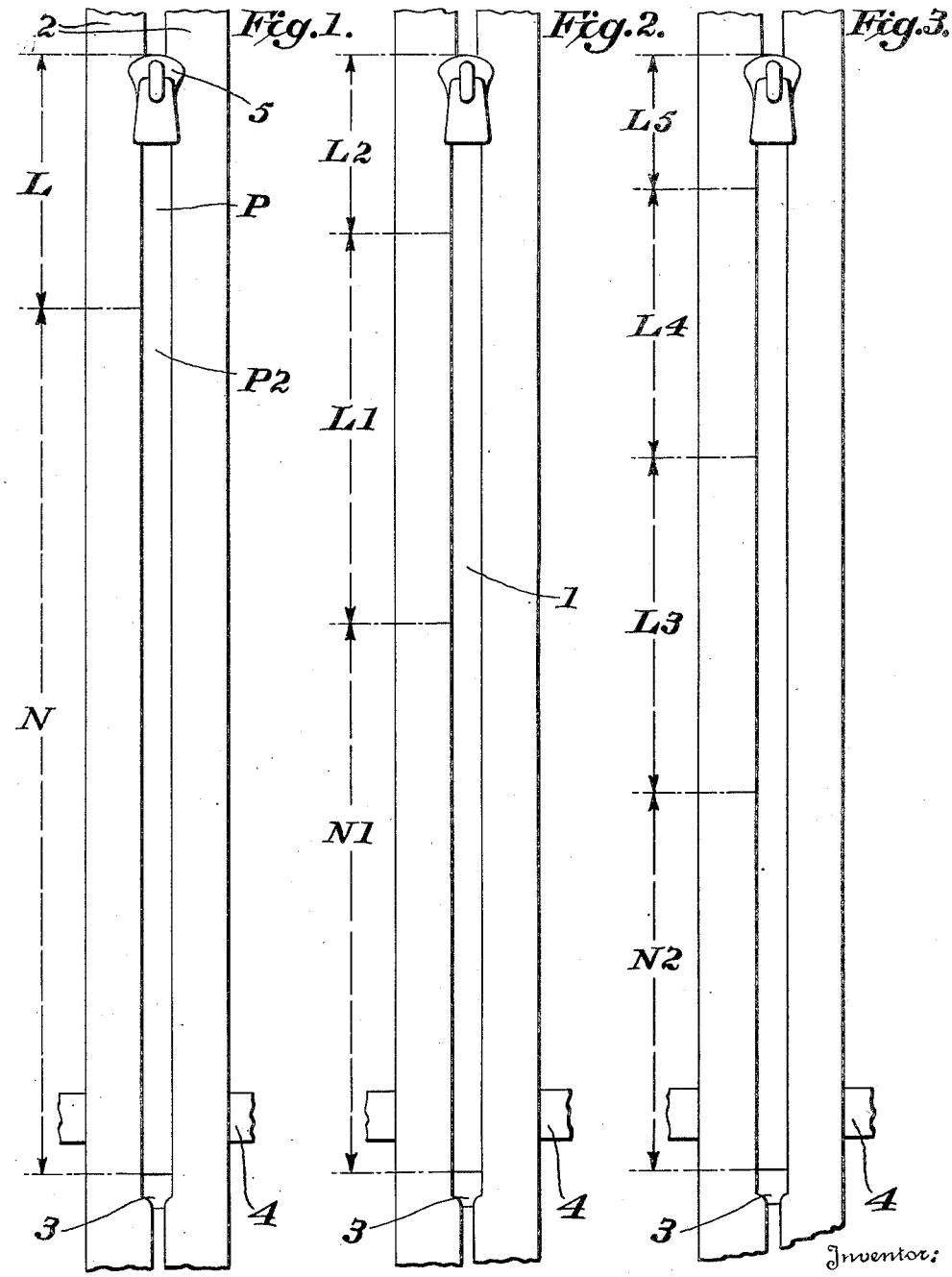

Filed Oct. 22, 1946      3 Sheets—Sheet 2

Inventor:

George H. C. Corner,
By Cushman, Darby & Cushman
Attorneys.

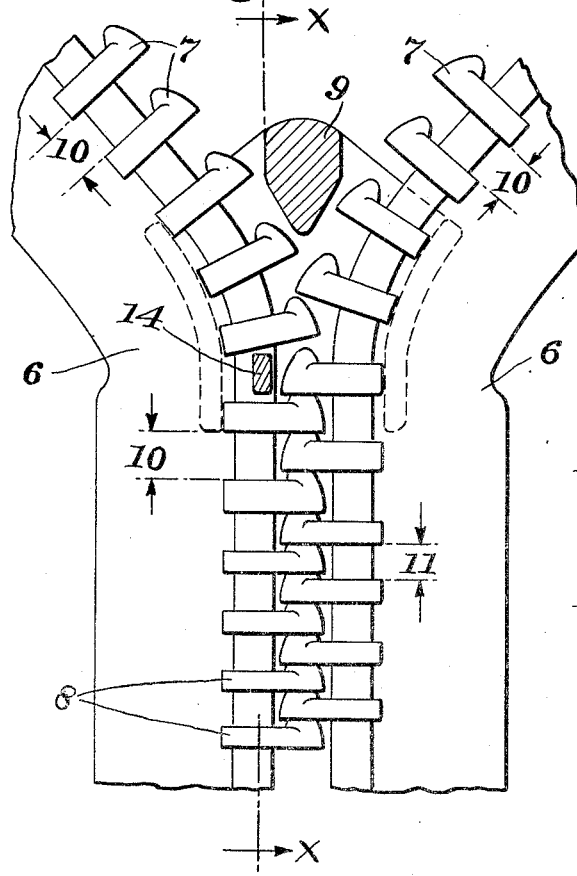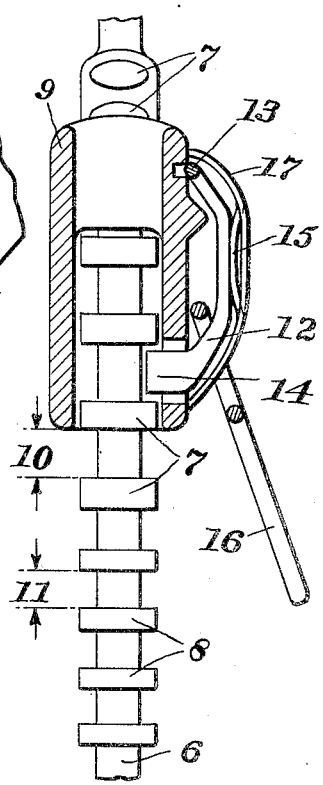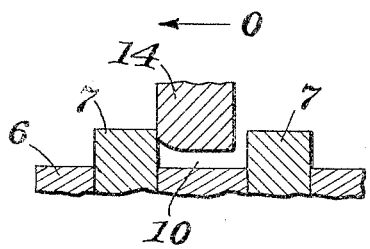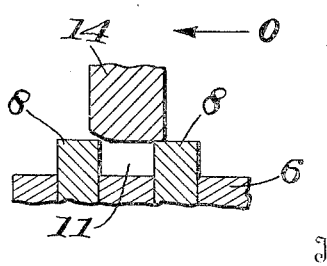

Patented Mar. 20, 1951

2,546,088

UNITED STATES PATENT OFFICE 2,546,088

SLIDING CLASP FASTENER

George H. C. Corner, Sutton Coldfield, England, assignor to Lightning Fasteners Limited, a corporation of Great Britain Application October 22, 1946, Serial No. 704,898
In Great Britain October 15, 1945

4 Claims. (Cl. 24—205.14)

This invention relates to sliding clasp fasteners of the well known kind comprising two flexible stringers consisting of fastener members mounted on tapes and adapted to be connected and disconnected by the movement of a slider up and down the said stringers and relates more particularly to such fasteners which can be locked in the closed or partly closed positions by means of mechanical devices usually embodied in the slider, in the fastener stringers or in both slider and fastener stringers.

Locking fasteners of the kind referred to came into use many years after the same kind of fasteners, without locking means, had been used by the public, and the introduction of mechanical devices to lock the sliders on any position along the length of the fasteners often resulted in complaints from customers who had subjected the fasteners to rough usage. For instance, when the wearer of a pullover with a sliding clasp fastener of the locking type fitted at the V neck, removed the garment over the head while the slider was locked in the half open position on the fastener, he applied an excessive strain on the fastener members on both stringers of the fastener. Strains of this kind, when roughly applied, sometimes break or weaken the locking mechanism embodied in the slider, but more often the fastener members are loosened on the edges of the fabric tapes, or pulled out of alignment, thus disturbing the regular spacing of the fastener members and preventing correct interlocking of one stringer with the other. In some instances the sliders have, by use of excessive force, torn the fastener members off the fabric tapes or jammed the slider in the middle of the fastener where the fastener could neither be opened or closed in the proper manner. Such weakening and loosening of the fastener members does not of course take place when the sliders are of the non-locking kind, since any strain applied, provided it is not excessive, merely serves to move the slider to the extreme bottom or fully open position of the fastener.

Locking fasteners of the type in which the slider could be locked in any position along the length of the fastener came into general use for numerous other garments, and as the trend was to make fasteners with smaller and, in consequence, weaker fastener members, the rough usage and excessive strain became more marked than ever.

An attempt was made to solve the problem by arranging that the slider would lock only in the top stops, that is at the extreme top of the opening end of the fastener, and be free to slide along the whole length of the fastener stringers, from top to bottom, without becoming locked on the fastener. This did not prove entirely satisfactory, mainly on account of the user not always taking the trouble to make sure that the slider had been pulled right up to the extreme top end of the fastener when effecting closing. The result was that the slider, not being in the locked position, crept along the fastener towards the open position.

An alternative device aimed at transferring strain from the fastener members to the fastener tapes and the garment is that described in British Patent No. 433,139 and known as a "strain tape." It consists of a tape extending across the back of the fastener near its lower end and secured to the two fastener tapes for the purpose of protecting the fastener members and the bottom stop of the fastener against excessive strain, and while serving admirably when used in conjunction with a non-locking slider, it will of course only give satisfactory results when used in conjunction with a locking slider provided that the slider is always moved right to the extreme bottom of the fastener or at least well below the strain tape. In actual practice the wearer of the garment does not always move the slider to the bottom stop of the fastener and in such event the same straining of the fastener members is experienced as if no strain tape had been used.

The object of the present invention is to provide a fastener which can be standardised for universal use with all of the numerous kinds of garments and articles to which sliding clasp fasteners are usually fitted and be free from all of the aforesaid disadvantages, and which can be produced in a simple and effective manner.

In accordance with the present invention we provide an improved fastener of the kind described in which means are provided over a portion of the length of the fastener for locking the fastener in any desired position, or in any one of a number of positions, in the said portion against further opening, the remaining portion of the length of the fastener being so arranged that locking can be effected at no point thereon and the fastener becomes fully opened when the stringers are pulled apart.

The present invention also comprises methods of manufacturing fastener stringers suitable for use in sliding clasp fasteners as hereinabove defined.

The invention is illustrated but not limited by the accompanying drawings, in which:

Figures 1–3 show diagrammatically three constructions of fastener in accordance with the invention;

Figure 12 is a plan view of part of a fastener showing in detail a preferred method of carrying the present invention into effect;

Figure 13 is a sectional view along the line X—X in Figure 12;

Figures 14 and 15 are fragmentary sectional elevations showing part of a suitably profiled locking catch in a locking and non-locking position respectively on the fastener shown in Figure 12.

Figure 4:
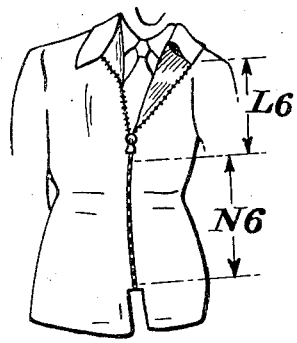
Figures 4-11 show a number of applications of fastener in accordance with the invention.

Referring to Figures 1-3, a fastener comprises fastener members 1 mounted on fastener tapes 2 provided with bottom stops 3, strain tape 4 and slider 5.

In Figure 1 the portion of the length of the fastener marked "L" is the length and total extent of the opening of the fastener which can be used for locking the fastener against further opening, and the remaining portion of the fastener marked "N" is the length of the fastener along which the fastener cannot be locked against further opening.

The fastener illustrated by Figure 2 has a free or "non-locking" portion marked N1, a locking portion L1 with a coarse or wide spaced arrangement of locking against further opening of the fastener, and a locking portion L2 with a fine or closely spaced adjustment of locking against opening.

Figure 3 shows another graded arrangement of locking at the top or opening end of the fastener with the "non-locking" or "tear-open" portion at the bottom of the fastener. N2 is the "non-locking" portion, L3 a very coarse arrangement of locking, L4 a medium spacing of locking adjustment and L5 a fine spacing of locking.

In all three illustrations referred to, the fine spacing of the locking may be about $\frac{1}{16}''$ or $\frac{1}{8}''$ between each step of opening and locking, and in the medium or coarse portions the adjustment of locking may be anything desired say from $\frac{1}{8}''$ steps to 1" steps.

It will already be clear that the slider 5 is the means used for locking the fastener against further opening and that the said slider is free to move along the "non-locking" portions N, N1 and N2 when the fastener stringers are pulled apart laterally.

Before giving a description of a suitable mechanical arrangement of slider and fastener chain, reference will be made to some of the uses to which the new fastener will be of advantage as compared with the known sliding clasp fasteners.

Figure 4 shows a golf jacket with a fastener in accordance with the present invention fitted to the front opening of the garment. The length of fastener represented by L6 is the part of the fastener on which the slider can be placed in any position to suit the wearer and be locked on the fastener in that position to prevent any further opening of the fastener. N6 is the free length, or the length along which locking of the slider automatically or otherwise, is not only unnecessary but decidedly undesirable.

Figure 5:
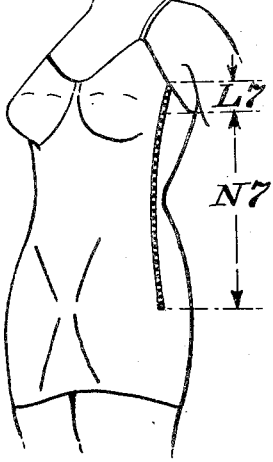

Figure 5 shows a fastener in accordance with our invention fitted to a lady's corset. A fastener of the known type arranged to lock only in the top stops at the extreme top end of the fastener often fails to provide an entirely reliable and secure fastening on account of either the slider creeping, or becoming disengaged from the top stops because the wearer has failed to pull the slider up to its uppermost position. When known fasteners with prong locking or automatic locking sliders have been used for this kind of garment, the slider being locked at any position, say two inches from the bottom end of the fastener, exerts an excessive strain on the fastener members and on the slider when the wearer takes the garment off. The new fastener eliminates the defects in the known fasteners as shown by L7 the length of fastener on which the slider effects locking of the fastener and N7 the remainder of the fastener on which locking of the slider on the fastener is not possible.

Figure 6:
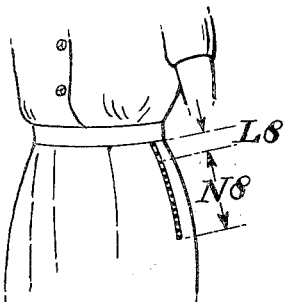

Figure 6 is a sketch of a skirt placket fitted with a fastener in accordance with our invention, L8 being as before the range of locking while N8 is the "non-locking" or "tear-open" part of the fastener.

Figure 7:
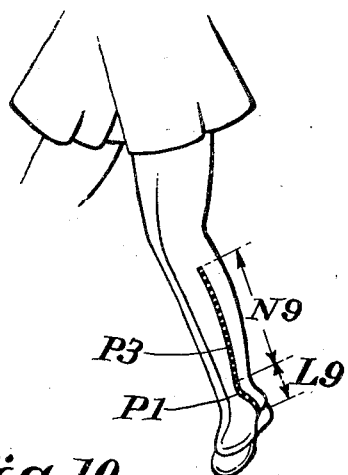

Figure 7 is a sketch of part of a child's leggings and illustrates another useful application of fastener in accordance with our invention. L9 is the locking portion and N9 the free opening. Garments of this kind are often subjected to very rough usage during removal from the person, and the new fastener eliminates the excessive straining which takes place in the known type of fastener when used with this kind of garment.

Figure 8:
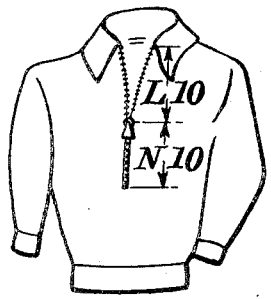

Figure 8 shows a pullover fitted with a fastener made in accordance with the present invention. L10 is the adjustable extent of the neck opening controlled by the slider which can be locked in any desired position on that part of the fastener. The lower part of the fastener N10 is the length along which the slider is free to travel when the wearer removes the garment overhead.

Figure 9:
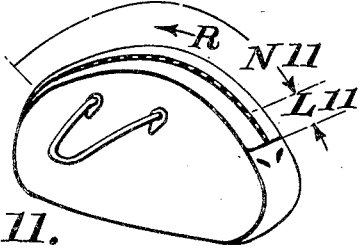

Figure 9 illustrates a fastener in accordance with our invention fitted to a shopping bag. L11 is the portion where the fastener can be locked against further opening and N11 the length of fastener along which the slider is free to ride in the direction of arrow R when the sides of the bag are pulled apart.

Figure 10:
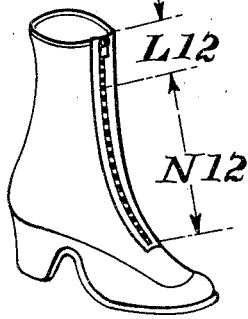

Figure 10 illustrates a boot fitted with a fastener in accordance with our invention. In the known art boots of this kind are usually fitted with fasteners having sliders which can be locked anywhere along the whole length of the fastener, resulting in applying excessive strain on the fastener when the boot is removed from the foot while the slider is say one inch from the bottom or closed end of the fastener. An alternative known fitting of the known sliding clasp fasteners to boots is the use of a prong locking slider in which a locking prong forms part of the pull tab and the construction of the opening flaps of the boot is such that the pull tab of the slider rides on the said flaps to keep the slider locking prong out of engagement with the fastener members during opening of the fastener. Both of these known methods are subject to the defect that the slider can be very easily moved into locking engagement with the fastener members and in time cause failure of the fastener on account of straining and loosening of the fastener members. The new fastener is positive in that it locks anywhere along the top inch or so of the length of the fastener L12 but under no circumstances is it possible to lock it while the slider travels along the remainder of the fastener N12.

Figure 11:

Figure 11 shows a shoe fitted with a fastener in accordance with our invention, L13 being the length of the locking portion and N13 the length of the "non-locking" or "tear-open" portion of the fastener. In the known art it is usual to use a fastener with a prong locking slider or an automatic or self-locking slider for this kind of article and as already explained, the known fasteners do not provide entire satisfaction and long life of the fasteners when the conditions of rough usage are taken into account.

Referring to Figures 12–15, a fastener comprises a fabric tape 6 upon the edges of which are mounted fastener members or elements 7, 8 having the usual interlocking projections and cavities for joining the two edges of the fastener together by means of the slider 9. The fastener members are located on the fastener in two groups. The first group comprises thick members 7 with wide spaces 10 between members; this group forms the locking portion of the length of the fastener and it is usually at the top or the fully closed end of the fastener. The second group comprises thin members 8 with narrow spaces 11 between members; this group forms the "tear-open" or "non-locking" portion of the length of the fastener and it will usually be at the bottom or closed end of the fastener.

Referring now to the slider 9 which is used for opening and closing the fastener there is a locking arm or detent 12 mounted on the slider body and hinged at 13. This locking arm has a tooth or catch 14 arranged to automatically lock the slider on the fastener when the tooth or catch drops into the space 10 between the fastener members. The spring 15 presses the locking arm 12 into its locked position and the pull tab 16 is the means by which the catch 14 is automatically lifted to the unlocked position when the slider is moved in either direction along the length of the fastener. 17 is a cover or cap which acts as a stop to limit the amount of lift of the catch 14. It will be noted that while the catch 14 of the locking arm 12 will drop between the widely spaced thicker fastener members 7 and so lock the slider on the fastener, it is too large to allow it to drop into the narrower spaces 11 in the group of thinner members 8, thus allowing it to ride over the top faces of the members 8 and not to become locked on the fastener.

Figure 14 shows a suitably profiled catch arranged to provide secure and positive locking on the locking length of the fastener together with a smooth and non-scratchy movement over the non-locking portion of the fastener as indicated in Figure 15. The arrow O indicates the direction of movement of the slider to open the fastener.

The fastener works as follows. The pull tab 16 is moved by the wearer of the garment when it is desired to open or close the fastener. The normal operation of moving the slider 9 up or down the fastener lifts the locking arm 12 against the resistance of the spring 15 and the catch 14 is automatically lifted out of engagement with the fastener members while moving the slider in either direction along the length of the fastener. When the user releases the pull tab 16 the spring 15 presses the catch 14 into contact with the fastener members and if the slider is released at the top of the fastener where the widely spaced thicker fastener members 7 are located the catch will fall into its position 10 between two of the members and lock the fastener against further opening. On the other hand if the slider pull is released while the slider is located on the lower length of the fastener with the thinner and closely spaced fastener members 8 the locking catch 14 being unable to engage between the closer spaced members 8 glides over them, and if the sides of the fastener are pulled apart laterally the slider will be free to move to the bottom stop of the fastener. It will now be clear that when the pull tab of the slider is released at, for instance, point P in Figure 1 or the point P1 in Figure 7 to lock the fastener in position there is no chance of the fastener creeping open. In addition it will be understood that if the pull tab of the slider is released at point P2 in Figure 1 and point P3 in Figure 7 when the wearer is about to remove the garment the slider will not lock on the fastener, thus avoiding weakening the fastener and slider. Instead it will automatically slide freely to the extreme end of the fastener and below the "strain tape," if one is fitted.

Another method of producing the fastener in accordance with our invention is to add a specially designed and produced component to form the whole of the locking length of the fastener and attach the said component to a piece of the standard or known fastener. For instance, fasteners eight inches long may be made by first of all producing lengths of standard or known fasteners say seven inches long, and before fitting the top stops, the specially designed components would be fitted to the fasteners to finish them off. The slider is arranged so that it cannot lock the fastener when it is anywhere on the seven inch length but will lock when moved to any place on the one inch length, the latter being the special component. The special component may consist of two one-inch lengths of fastener members arranged to interlock with each other in the usual manner, and the form of the component may be arranged to register with the locking mechanism of the slider to allow the fastener to be locked against further opening when the slider is released anywhere along the one inch length of the special component. The component may be made flexible along its length if flexibility is desired at the top or opening end of the fastener, or it may be a rigid piece and the two halves need not be arranged to interlock with each other. The top stops of the new fastener may be the known "standard" type comprising two stop pieces, one attached to each stringer of the fastener, or the known "bridge" top stop may be used to join the two stringers together at the top of the fastener in known manner. The top stops may be part of the aforesaid special component instead of being separate pieces.

Having now described a particular method of constructing slide fasteners so that they will function in accordance with our invention, reference will be made to other alternatives which may be used. For instance, the cam operated vice grip type of slider as described in British patent specification No. 357,072 may be used in combination with a variation in the depth, width or thickness of the fastener chain. The part of the fastener on which the slider can be locked to prevent further opening of the fastener is formed of such depth, width or thickness as to allow the halves of the slider to grip and lock the slider on the fastener chain when the cam, which is usually affixed to or forms part of the operating pull tab, is brought into operation by the movement of the pull tab, the remainder of the fastener chain on which locking of the fastener is not re- quired being of smaller depth, width or thickness so that even when the cam has been operated to compress the halves of the slider together there is still sufficient clearance between the slider and the fastener chain to prevent locking by the aforesaid method.

Other methods such as forming, moulding or casting recesses or specially formed faces on the fastener members may also be employed, in which cases some of the fastener members would be shaped to effect locking in combination with the slider while others would be so shaped as to prevent the slider from functioning as a means of locking the fastener against further opening.

Rapid production of fastener in accordance with the present invention can be accomplished by simple adaptation of the known processes of manufacture. The latter can be divided into four classes, namely:

(1) Manufacture of fastener stringers in continuous lengths by feeding a fabric tape and a metal wire, of specially formed cross section, through a machine where the fastener members are formed to shape and clamped on to the tape after preformed blanks or slices have been cut from the formed wire.

(2) Fastener members are blanked out from thin strip and introduced to a hopper feed machine where they are clamped on to the edge of a fabric tape which is passed through the machine in a step by step manner.

(3) Moulding or die-casting the fastener members in spaced relationship with one another in rows direct on to the edges of fabric tapes.

(4) Moulding or die-casting the fastener members one by one or in small groups of a few at a time direct on to the edges of fabric tapes.

In process (1) means may be incorporated in the known machines for automatically increasing the thickness of the fastener members during the production of each stringer. The increased pitch or space between members can also be obtained by adding suitable mechanism to existing machines. A solenoid operated mechanical control is fitted to trip the machine so as to provide say three-quarters of the length of each stringer with thin closely spaced members and the remainder with thicker members with wider spacing. This trip gear will, of course, operate once for each length of stringer produced. Suitable adjusting mechanism is provided so that the machine operative can set the machine for the total length of the fasteners to be produced and at the same time set the adjusting mechanism to provide the locking and non-locking portions of the fasteners. The machine once set will, as usual, then automatically produce fastener of the lengths required until the machine is reset to make other lengths. The operation of the solenoid to change over from thin to thick members and vice versa will take place without stopping the machine and three separate switch-over mechanisms are brought into operation simultaneously each time the aforesaid trip mechanism is brought into operation.

The first of the said switch-over mechanisms comprises two ratchet wheels, one for pulling the fabric tape through the machine step by step in short steps, the other for the longer steps. It should be understood that the steps referred to each represent the pitch between fastener members and that the short steps are for the non-locking part of the fastener and the longer steps for the locking portion.

The second of the said switch-over mechanisms also consists of two ratchet wheels, one for feeding the specially formed metal wire through the machine in short steps and the other for longer steps. Each step represents a fastener member sliced from the aforesaid specially formed wire. The thick slices are for the locking part of the fastener and the thinner slices for the non-locking portion of the length.

The third of the said switch-over mechanisms consists of two ratchets, one being coupled to a series of dies which provide large size interlocking projections and indentations in the heads of the fastener members and the other being coupled to a similar set of dies which produce smaller indentations and projections in the heads of the fastener members. The large size projections and indentations are for the locking length of the fastener and the small projections and indentations are for the non-locking length.

In method (2) the machine may be arranged with two hoppers instead of one, one hopper feeding thick members down a chute to the clamping on the tape position and the other feeding thinner fastener members down a separate chute to the clamping-on station. Suitable means are provided to interrupt the feed of one stream of fastener members while the other stream is in process of being fed to and clamped on to the tape. Automatic trip arrangements may be used to provide the desired groups of thick and thin members on each fastener stringer.

In process (3) the known two-piece die or mould which is used for casting or moulding a complete row or stringer of fastener members on to a fabric tape is so made as to provide two groups of fastener members, the members of each group being different in shape from the members in the other group, to form a single stringer. The said groups are "locking" and "non-locking" respectively and arranged to function in the aforesaid manner by co-operating with the locking mechanism of a suitably designed slider.

Process (4) may be adapted for making the fastener of the present invention by arranging an insert in the split die cavity and operating the insert by means of a cam or similar device. Again each stringer will have a group of fastener members on which the slider can be locked in position and another group on which the slider will not lock. The tape is passed through the machine in the well known step by step manner, casting of fastener members taking place on the edge of the tape after each step. In casting a stringer the casting of what can now be termed "non-locking" fastener members proceeds until a trip mechanism brings the said die cavity insert into operation thus changing the shape of the fastener members until the end of the stringer is reached and in this way forming the group of fastener members which will enable locking to be effected when used with a suitably designed slider.

Sliding clasp fasteners in accordance with the present invention possess a number of advantages over those in customary use hitherto. As hereinbefore pointed out, their employment obviates the risk of strain or damage to the stringers when they are pulled apart with the slider locked in an intermediate position instead of having been moved to the extreme end of the fastener, and in particular, when a strain tape is incorporated in the fastener, there is no risk of the object of the strain tape being defeated by accidental or careless intermediate locking of the slider.

A further important advantage is that the construction in accordance with the preferred embodiment of our invention permits the realisation of mechanical properties which have been unobtainable in the hitherto customary design of fastener. It will be understood that one of the essential principles in slide fastener manufacture is the provision of good flexibility along the length of the fastener chain. This objective is attained by making the fastener members in the form of thin plates and having as many as thirty such members for each inch of length of the fastener. Thin plate members of the kind referred to, while providing the desired amount of flexibility in the fastener chain, are not the ideal construction for withstanding excessive strain because the clamping legs of the members are usually too thin and consequently too weak to withstand anything more than the normal amount of strain applied under normal conditions of service. Half the number of fastener members per inch and twice the thickness of metal would double the strength of the legs of the members and enable them to resist even the most excessive strains applied under abnormal or rough usage conditions, but this improvement in strength is obtained at the expense of the flexibility of the fastener chain. It will thus be clear that the designer of a fastener has to choose between (a) a high degree of flexibility coupled with the lack of strength to resist the abnormal strain applied when a slider is locked on the fastener at the point of stress or (b) to use thicker and stronger fastener members and sacrifice some of the flexibility of the fastener chain. My improved fastener as described herein with particular reference to Figures 12–15 widens the scope of design and allows the designer to adopt a fastener much nearer to the ideal. For instance, in a seven inch length of fastener applied to a dress placket, six inches of the length from the bottom stop may have thin plate fastener members, say 28 per inch of length, and provide maximum flexibility along the whole of the six inch length, and as this is the portion of the length of the fastener which is "non-locking" there is no excessive stress to cater for. The remaining one inch at the top or opening end of the fastener is located in a position where maximum flexibility along its length is not so essential and this one inch length can have reduced flexibility without sacrificing any other essential or desirable features of design. The fastener members forming the top inch may be about 18 in number and may be much thicker and stronger than the members comprising the lower part of the fastener, and in consequence any separate member of the group would be capable of resisting the excessive strain applied when the slider is locked on the one inch length.

I claim:

1. A slide fastener comprising a pair of stringers having fastener elements thereon and a slider movable lengthwise of said stringers for engaging and disengaging the fastener elements to close or open said fastener, said slider having locking means thereon normally projected to locking position, a pull tab on said slider for moving the latter to and from open and closed positions, said pull tab being operatively connected to said locking means to hold the same in non-locking position when said slider is moved by means of said tab, the fastener elements over a length of said stringers cooperating with said locking means to permit the slider to be locked in a number of positions over said length when the slider is positioned thereover and the pull tab released, the fastener elements over another length of the stringers being so formed and positioned as to render said locking means ineffective when the slider is positioned thereover and the pull tab is released.

2. A slider fastener comprising a pair of stringers having fastener elements thereon and a slider movable lengthwise of said stringers for engaging and disengaging the fastener elements to close or open said fastener, said slider having locking means thereon normally projected to locking position, a pull tab on said slider for moving the latter to and from open and closed positions, said pull tab being operatively connected to said locking means to hold the same in non-locking position when said slider is moved by means of said tab, a number of recesses associated with said fastener elements over a length of the stringers, said recesses being positioned to receive said locking means in locking position when the slider is positioned thereover and said pull tab is released, the fastener elements over another length of the stringers being so formed and positioned as to render said locking means ineffective when said slider is positioned thereover and the pull tab is released.

3. A slide fastener comprising a pair of stringers having fastener elements thereon and a slider movable lengthwise of said stringers for engaging and disengaging the fastener elements to close or open said fastener, said slider having locking means thereon normally projected to locking position, a pull tab on said slider for moving the latter to and from open and closed positions, said slider having a locking detent thereon normally urged to a locking position, a pull tab on said slider for moving the latter to and from open and closed positions, said pull tab being operatively connected with said detent to hold the same in a non-locking position when the slider is moved by means of said tabs, the fastener elements over a portion of the stringers being spaced apart from one another a distance sufficient to permit the locking detent to drop between a pair of adjacent elements in locking position when the slider is positioned thereover and the pull tab released, the fastener elements over another portion of the stringers being more closely spaced so that the locking detent cannot drop between the elements but rests thereupon and may ride freely thereover when the tab is released.

4. A sliding clasp fastener as claimed in claim 3 wherein the forward edge of the locking detent, when the slider is being moved to fully open position, is beveled so as to ride smoothly over the fastener elements in the non-locking portion.

G. H. C. CORNER.

REFERENCES CITED

The following references are of record in the file of this patent:

UNITED STATES PATENTS

| Number | Name | Date |
|---|---|---|
| 2,074,368 | Corner | Mar. 23, 1937 |
| 2,102,328 | Morin et al. | Dec. 14, 1937 |
| 2,222,988 | Poux | Nov. 26, 1940 |
| 2,234,939 | Hatch | Mar. 19, 1941 |
| 2,299,606 | Wintritz | Oct. 20, 1942 |
| 2,366,948 | Winterhalter | Jan. 9, 1945 |

FOREIGN PATENTS

| Number | Country | Date |
|---|---|---|
| 492,180 | Great Britain | of 1938 |
| 512,643 | Great Britain | of 1939 |